United States Patent [19]

Weber

[11] Patent Number: 4,971,104
[45] Date of Patent: Nov. 20, 1990

[54] SELF POWERED SERVO ACTUATED BACKPRESSURE REGULATING VALVE

[75] Inventor: Kent Weber, Rockford, Ill.

[73] Assignee: Sundstrand Corporation, Rockford, Ill.

[21] Appl. No.: 486,368

[22] Filed: Feb. 28, 1990

[51] Int. Cl.⁵ .......................................... G05D 16/00
[52] U.S. Cl. .................................. 137/489.5; 251/46
[58] Field of Search ................. 137/489.5, 489, 491, 137/492, 492.5, 220, 221; 251/33, 46

[56] References Cited

U.S. PATENT DOCUMENTS

| | | | |
|---|---|---|---|
| 2,687,868 | 8/1954 | Barrett | 137/221 X |
| 2,827,075 | 3/1958 | Mercier . | |
| 3,493,008 | 2/1970 | Scaglione . | |
| 3,556,128 | 1/1971 | Scaglione . | |
| 3,952,773 | 4/1976 | Hahn | 137/489 |
| 3,965,693 | 6/1976 | Widdowson | 137/491 X |
| 4,617,958 | 10/1986 | Seidel et al. . | |
| 4,619,115 | 10/1986 | Weber . | |
| 4,682,622 | 7/1987 | Weber . | |

Primary Examiner—Alan Cohan
Attorney, Agent, or Firm—Antonelli, Terry, Stout & Kraus

[57] ABSTRACT

A self-powered servo-actuated backpressure regulating valve including a valve housing (1) having an inlet port (2) and an outlet port (3). A valve plate (4) is disposed in the housing (1) and supported by an evacuated chamber (12) defined by a bellows (10) so as to be movable toward and away from a valve seat (15) of the inlet port (2) fluid pressure acting on the valve plate (4) is controlled by a valve assembly including a valve plate (32) supported in a housing portion (51) of a fixed support (50) by a bellows (30) defining an evacuated chamber (35). The valve plate (32) is exposed to pressure of the fluid in the inlet port (2) by way of an opening (54) with the pressure causing a displacement of the valve plate (32). A bellows (20) supports the valve plate (4) relative to the valve assembly so as to permit movement of the valve plate (4) relative to the valve seat (15).

31 Claims, 1 Drawing Sheet

SELF POWERED SERVO ACTUATED BACKPRESSURE REGULATING VALVE

TECHNICAL FIELD

The present invention relates to a pressure regulating valve and, more particularly, to a self powered servo-actuated backpressure regulating valve for, for example, a two phase thermal management system constructed so as to provide a reduced pump flow rate and therewith reduced power consumption and, at the same time, enable an overall reduction in the total weight of the valve.

Self powered pressure regulating valve arrangements have been proposed and each have been effective to a greater or lesser extent in achieving a desired pressure regulation; however, the proposed valve arrangements have one or more disadvantages.

BACKGROUND ART

In U.S. Pat. No. 2,827,075 a servo pressure regulator valve is proposed; however, the proposed construction does not render the same readily applicable to thermal management systems by virtue of the non-hermetic sealing of the valve casing. Moreover, the proposed valve construction includes a number of individual components many of which are in sliding engagement and/or are fashioned of a material which limits not only the application of the proposed valve structure but also the service life thereof.

In U.S. Pat. Nos. 3,556,128 and 3,493,008, pressure balanced regulating valves are proposed; however, the proposed valves are two stage regulating valves requiring an external pilot valve. Additionally, the proposed valves require a considerable number of sliding components resulting in not only affecting the service life of the valve but also providing more occasion for a possible malfunctioning of the overall valve structure.

Likewise, in U.S. Pat. No. 4,617,958, a multi-function pressure regulation control valve is provided which includes a number of individual components many of which are in a sliding fit in addition to a number of individual seals. The proposed multi-function valve is controlled or actuated by external electric signals and, by virtue of the number of components and sliding fits, the proposed valve construction is subject to possible malfunctioning as well as a shortened useful life.

U.S. Pat. No. 4,682,622 proposes a self-powered pressure regulating valve constructed as a delta pressure regulator; However, one disadvantage of this proposed construction resides in the requirement for external lines for a pressure sensing.

U.S. Pat. No. 4,619,115 proposes a backpressure regulating valve; however, a disadvantage of this proposed valve resides in the fact that the valve is not self-powered and is somewhat complicated in construction.

DISCLOSURE OF INVENTION

The aim underlying the present invention essentially resides in providing a self-powered servo-actuated backpressure regulating valve which avoids, by simple means, shortcomings and disadvantages encountered in the prior art.

In accordance with the present invention, a self-powered servo-actuated backpressure regulating valve is provided and constructed so as to advantageously utilize a servo-amplifying action to permit a main valve to be displaced over a full operating stroke with only a slight pressure increase.

To avoid the need for a separate valve actuation fluid, the present invention provides for a maintenance of a tight control of the valve inlet pressure, using only the inlet pressure to drive or displace the main valve.

In accordance with advantageous features of the present invention, a hermetically sealed valve housing is provided including an inlet port and an outlet port, with a valve plate being displaceably accommodated in the valve housing for movement toward and away from a valve seat so as to throttle a flow from the inlet port to the outlet port. The valve plate is supported by a flexible support, preferably, a metal bellows, having an effective area at least equal to the area of the valve seat, and a chamber defined by the valve plate and the bellows is evacuated.

To control a positioning of the valve plate, means are provided for dividing a forward face of the valve plate into two concentric areas, with such means including, for example, a bellows, with the valve opening only when an inner area of the forward face of the valve plate is exposed to a sufficient pressure determined in accordance with a balance of flow through the chamber defined by the bellows.

To control the balance of flow, yet another bellows is provided defining an evacuated bellows chamber, with the additional bellows including a valve member subjected to a pressure in the inlet port.

The above and other objects, features, and advantages of the present invention will become more apparent from the following description when taken in connection with the accompanying drawings which show, for the purpose of illustration only, one embodiment in accordance with the present invention.

BEST MODE FOR CARRYING OUT THE INVENTION

Figure 1:
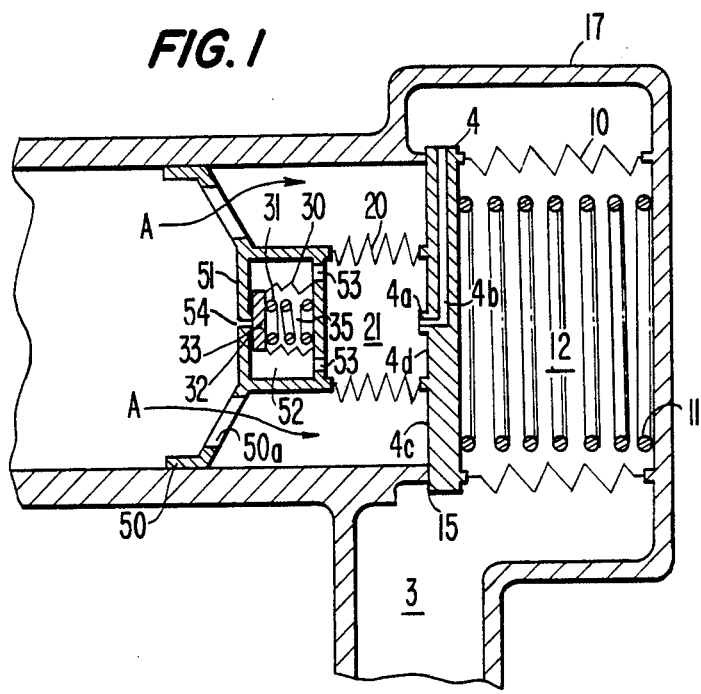
FIG. 1 is a cross-sectional view of a self-powered backpressure regulating valve constructed in accordance with the present invention in a closed position.

Referring now to the drawings wherein like reference numerals are used in both views to designate like parts and, more particularly, to FIG. 1, according to this figure, a self-powered backpressure regulating valve in accordance with the present invention includes a hermetically sealed housing 1 forming an inlet port generally designated by the reference numeral 2 and an outlet port generally designated by the reference numeral 3. A valve plate 4 is flexibly supported in the hermetically sealed housing 1 for movement toward and away from a valve seat 15, with the flexible support including a bellows 10 fashioned of a metallic material. A biasing means such as, for example, a spring 11 is provided for normally urging the valve plate 4 into a sealing engagement with the valve seat 15.

The valve plate 4, bellows 10 and a portion of the hermetically sealed housing 1 define therebetween a chamber 12 which is evacuated and sealed. The valve plate 4 includes a radially extending passage 4b terminating at one end thereof at a periphery of the valve plate 4, exteriorly of the evacuated chamber 12 and, at the other end thereof, in a restricted passage means 4a.

A mounting fixture 50 is fixedly arranged in a suitable manner in the inlet port 20 at a position upstream of the valve plate 4, as viewed in a flow direction through the valve, with the mounting fixture 50 including a plurality of through passages 50a and a housing portion 51 defining a chamber 52. An orifice 54 is provided in one wall of the housing portion 51, with a plurality of orifices or openings 53 being provided in an opposite wall of the housing portion 51.

A valve arrangement is accommodated in the chamber 52, with the valve arrangement including a valve plate 32 flexibly supported on a wall of the housing portion 51 for movement toward and away from the orifice 54. The flexible support for the valve plate 32 may, for example, include a bellows 30 of a metallic material having one end fixed to the valve plate and the opposite end fixed to the wall of the housing portion 51. A biasing means such as, for example, a spring 31 is provided for normally urging the valve plate 32 into sealing engagement with a valve seat of the orifice 54 thereby preventing communication between the inlet port 2 and the chamber 52. The bellows 30, valve plate 32, and wall of the housing portion 51 define therebetween a chamber 35 which is evacuated and sealed.

A flexible member such as, for example, a bellows 20, of a metallic material, is interposed between and connected at respective opposite ends of the valve plate 4 and housing portion 51. The bellows 20 defines a chamber with the housing portion 51 and a surface of the valve plate 4. The orifices or openings and restricted passage means 4a enable the chamber 21 to be in communication with the chamber 52 and the passage 4b.

The bellows 20 divides the forward face of the valve plate 4 into two concentric areas, namely, an outer annular area 4c and an inner area 4d, with the outer annular area 4c being subjected to a pressure of the inlet fluid urging an opening displacement of the valve plate 4 against the biasing force of the spring 11. The biasing force of the spring 11 is selected so as to maintain the valve plate 4 in the closed position over a range of inlet pressures anticipated to be acting on the opposing annular area 4c.

Figure 2:
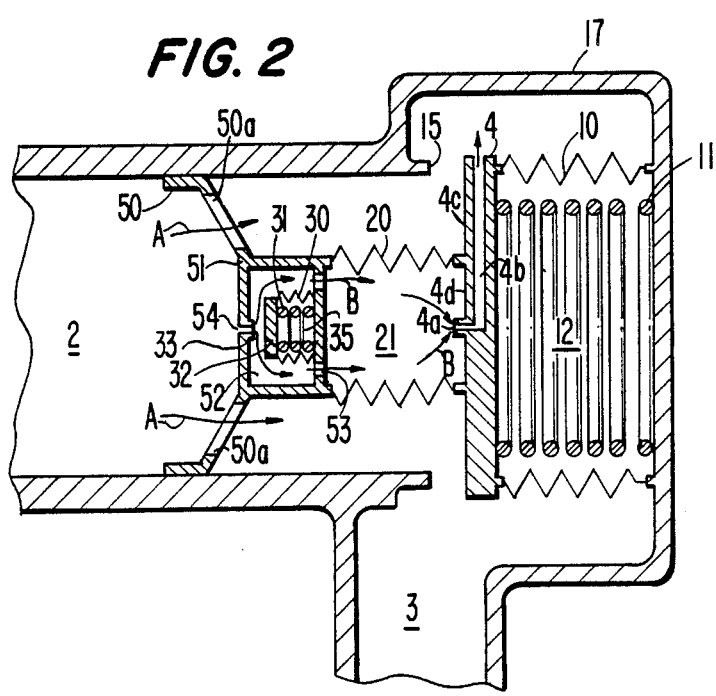
FIG. 2 is a cross-sectional view of the self-powered backpressure regulating valve of FIG. 1 with the valve plate thereof in an open position.

FIG. 1 illustrates a position of the respective components of the self-powered servo-actuated backpressure regulating valve of the present invention when both valve plates 4 and 32 are in a closed position, with FIG. 2 illustrating the open positions of the valve plates 4 and 32. The manner by which the displacement or movement of the valve plates 4 and 32 is effected is described more fully hereinbelow.

As shown in FIG. 1, a fluid is introduced into the inlet port 2, with the fluid traveling in a direction of the arrows A. As the fluid pressure increases, the pressure of the fluid acts on the valve plate 32 through the orifice or opening 54 urging the valve plate 32 against the biasing force of the spring 31 attempting to maintain the valve plate 32 in a closed position against the valve seat until the inlet pressure at the inlet port 2 rises to a regulating pressure.

Upon an attainment of the regulating pressure acting on the valve plate 32, the valve plate 32 is displaced away from the valve seat 33 permitting fluid to flow in the direction of the arrows B thereby pressurizing the chamber 21 and opening the valve by displacing the valve plate 4 away from the valve seat 15. The fluid in the chamber 21 exits the chamber 21 through the orifice or opening 4a and passage 4b in the valve plate 4, with the exiting fluid being replaced by fluid entering through the opening 54.

As the backpressure at the inlet port 2 increases, more fluid flows into the chamber 21 by virtue of an increasing in the opening caused by the further displacement of the valve plate 32 from the opening 54. The greater the fluid flow into the chamber 21 causing the pressure in the chamber 21 to rise, the further the valve plate 4 is displaced away from the valve seat as shown most clearly in FIG. 2, thus relieving excess inlet pressure. Conversely, as the inlet pressure falls, the opening 54 is closed accordingly thereby resulting in the pressure in the chamber 21 falling so as to eventually result in a closing of the valve by the valve plate 4 being brought back into sealing contact with the valve seat 15.

While I have shown and described only one embodiment in accordance with the present invention, it is understood that the same is not limited thereto but is susceptible to numerous changes and modifications as known to one of ordinary skill in the art, and I therefore do not wish to be limited to the details shown and described herein, but intend to cover all such modifications as are encompassed by the scope of the appended claims.

What is claimed:

1. A self-powered servo-actuated backpressure regulating valve comprising a valve housing means including an inlet port means and an outlet port means, valve plate means disposed in said valve housing means, means defining an evacuated chamber means for supporting said valve plate means so as to be movable toward and away from a valve seat means of the inlet port means, means for controlling the fluid pressure acting on said valve plate means, and means defining a chamber means for supporting said valve plate means with respect to said means for controlling so as to enable the valve plate means to be movable relative to said means for controlling whereby said means for controlling enables a fluid pressure to be applied to said valve plate means through said chamber means.

2. A self-powered servo-actuated backpressure regulating valve according to claim 1, wherein said means for controlling includes a pressure responsive valve means fixedly mounted upstream of the valve plate means, as viewed in a flow direction through the regulating valve.

3. A self-powered servo-actuated backpressure regulating valve according to claim 2, wherein said pressure responsive valve means includes a further valve plate means accommodated in a further chamber means provided in a support means fixedly mounting the pressure responsive valve means in the inlet port means, means for exposing the further valve plate means to a pressure in the inlet port means, and means defining a further evacuated chamber means for supporting said further valve plate means for movement toward and away from a valve seat means provided at said means for exposing.

4. A self-powered servo-actuated backpressure regulating valve according to claim 3, wherein means are provided in the first mentioned valve plate means for enabling a venting of the first mentioned chamber means.

5. A self-powered servo-actuated backpressure regulating valve according to claim 4, wherein means are provided in the first mentioned evacuated chamber for normally urging the first mentioned valve plate means into sealing engagement with the valve seat means of said inlet port means.

6. A self-powered servo-actuated backpressure regulating valve according to claim 5, wherein said means for supporting the first mentioned valve plate means so as to be movable toward and away from the valve seat means of the inlet port means includes a bellow means connected to the first mentioned valve plate means and a portion of the housing means.

7. A self-powered servo-actuated backpressure regulating valve according to claim 6, wherein said bellow means is fashioned of a metallic material.

8. A self-powered servo-actuated backpressure regulating valve according to claim 6, wherein means are provided in said further evacuated chamber means for normally urging said further valve plate means into sealing engagement with the valve seat means provided at said means for exposing.

9. A self-powered servo-actuated backpressure regulating valve according to claim 8, wherein said means for supporting the first mentioned valve plate means with respect to said means for controlling includes a further bellow means interposed between and connected to the first mentioned valve plate means and a portion of the support means.

10. A self-powered servo-actuated backpressure regulating valve according to claim 9, wherein said further bellows means is fashioned of a metallic material.

11. A self-powered servo-actuated backpressure regulating valve according to claim 9, wherein said further bellows means is disposed relative to the first mentioned valve plate means so as to define first and second concentric pressure areas on the first mentioned valve plate means.

12. A self-powered servo-actuated backpressure regulating valve according to claim 11, wherein the first pressure area is defined within confines of the first mentioned chamber means and the second pressure area is defined by an annular surface area of the first mentioned valve plate means surrounding the first pressure area.

13. A self-powered servo-actuated backpressure regulating valve according to claim 11, wherein said means for exposing includes an opening means provided in a wall of the support means in communication with the inlet port means and the further chamber means provided in the support means, and wherein means are provided in the support means for enabling the fluid to act on the second pressure area.

14. A self-powered servo-actuated backpressure regulating valve according to claim 13, wherein at least one further opening means is provided in a further wall of the support means for communicating the further chamber means with the first mentioned evacuated chamber means.

15. A self-powered servo-actuated backpressure regulating valve according to claim 14, wherein said means defining a further evacuated chamber means includes an additional bellows means interposed between and connected to said further valve plate means and a portion of the support means.

16. A self-powered servo-actuated backpressure regulating valve according to claim 15, wherein the additional bellows means is fashioned of a metallic material.

17. A self-powered servo-actuated backpressure regulating valve according to claim 15, wherein said means for enabling a venting of the first mentioned chamber means includes a fixed orifice means provided in the first mentioned valve plate means communicating with the first mentioned chamber means, and at least one passage means communicating with the fixed orifice means and a portion of the regulating valve located exteriorly of the first mentioned evacuated chamber.

18. A self-powered servo-actuated backpressure regulating valve according to claim 17, wherein the at least one passage means includes a radially outwardly extending passage in the first mentioned valve plate means terminating in a peripheral portion of the first mentioned valve plate means.

19. A self-powered servo-actuated backpressure regulating valve according to claim 18, wherein the valve housing means is hermetically sealed.

20. A self-powered servo-actuated backpressure regulating valve according to claim 1, wherein said means for supporting said valve plate means so as to be movable toward and away from the valve seat of the inlet port means includes a bellows means connected to the valve plate means and a portion of the valve housing means.

21. A self-powered servo-actuated backpressure regulating valve according to claim 20, wherein said means for supporting said valve plate means so as to be movable relative to said means for controlling includes a further bellows means interposed between and connected to said valve plate means and a support means for fixedly mounting the means for controlling in the inlet port means.

22. A self-powered servo-actuated backpressure regulating valve according to claim 21, wherein said means for controlling includes a pressure responsive valve means comprising a valve member exposed to a pressure of fluid in the fluid inlet port means and supported at the support means by a further evacuated chamber means.

23. A self-powered servo-actuated backpressure regulating valve according to claim 22, wherein the further evacuated chamber means is defined by an additional bellows means interposed between the valve member and a portion of the support means.

24. A self-powered servo-actuated backpressure regulating valve according to claim 23, wherein the first mentioned, further and additional bellows means are fashioned of a metallic material.

25. A self-powered servo-actuated backpressure regulating valve according to claim 24, wherein the valve housing means is hermetically sealed.

26. A self-powered servo-actuated backpressure regulating valve according to claim 1, wherein said means for supporting said valve plate means so as to be movable relative to said means for controlling includes bellows means interposed between and connected to said valve plate means and a support means fixedly mounting the means for controlling in the inlet port means.

27. A self-powered servo-actuated backpressure regulating valve according to claim 26, wherein said bellows means is fashioned of a metallic material.

28. A self-powered servo-actuated backpressure regulating valve according to claim 27, wherein the valve housing means is hermetically sealed.

29. A self-powered servo-actuated backpressure regulating valve according to claim 1, wherein said means for controlling includes a pressure responsive valve means exposed to a pressure of fluid in the fluid inlet port means comprising a valve means supported by a further evacuated chamber means at a support means fixedly mounting the means for controlling at the inlet port means.

30. A self-powered servo-actuated backpressure regulating valve according to claim 29, wherein the further evacuated chamber means is defined by a bellows means interposed between the valve means and a portion of the support means.

31. A self-powered servo-actuated backpressure regulating valve according to claim 30, wherein the valve housing means is hermetically sealed.

* * * * *